Sheet 1, 2 Sheets.

A. Swingle.

Sewing Mach.

No. 410. Reissued Nov. 4, 1856.

Sheet 2, 2 Sheets.

A. Swingle.

Sewing Mach.

No. 410. Reissued Nov. 4, 1856.

UNITED STATES PATENT OFFICE.

E. TOWNSEND, OF BOSTON, MASSACHUSETTS, ASSIGNEE OF A. SWINGLE.

IMPROVEMENT IN SEWING-MACHINES.

Specification forming part of Letters Patent No. 15,396, dated July 22, 1856; Reissue No. 410, dated November 4, 1856.

*To all whom it may concern:*

Be it known that ALFRED SWINGLE, late of Boston, in the county of Suffolk and State of Massachusetts, invented a new and useful or Improved Machine for Sewing Leather or other Material, such being particularly adapted to sewing with two waxed threads; and whereas Letters Patent of the United States of America, numbered 15,396, and bearing date July 22, A. D. 1856, have been granted to me, ELMER TOWNSEND, of the aforesaid place, as the assignee of all the right, title, and interest of the said SWINGLE in the said machine or invention; and whereas said Letters Patent have been deemed inoperative or not fully available by reason of an insufficient description or specification: Now, therefore, I, the said ELMER TOWNSEND, do hereby declare the said machine or invention to be fully or more perfectly described and represented in the following specification and the accompanying drawings, of which—

Figure 1:
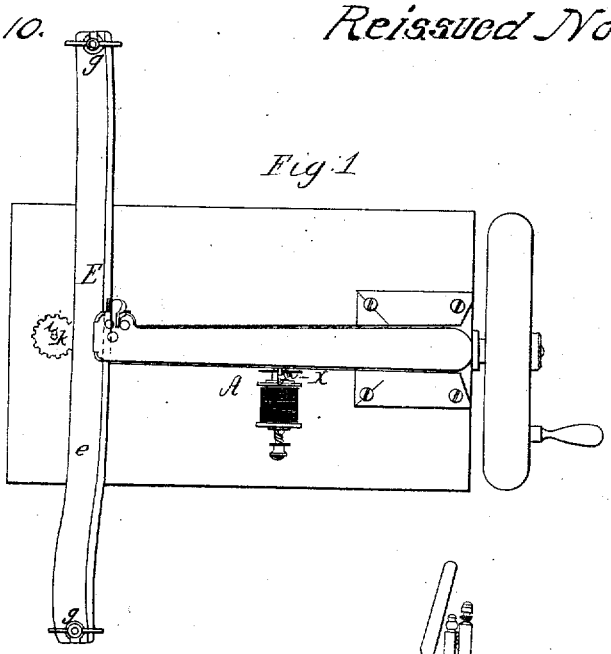
Figure 2:
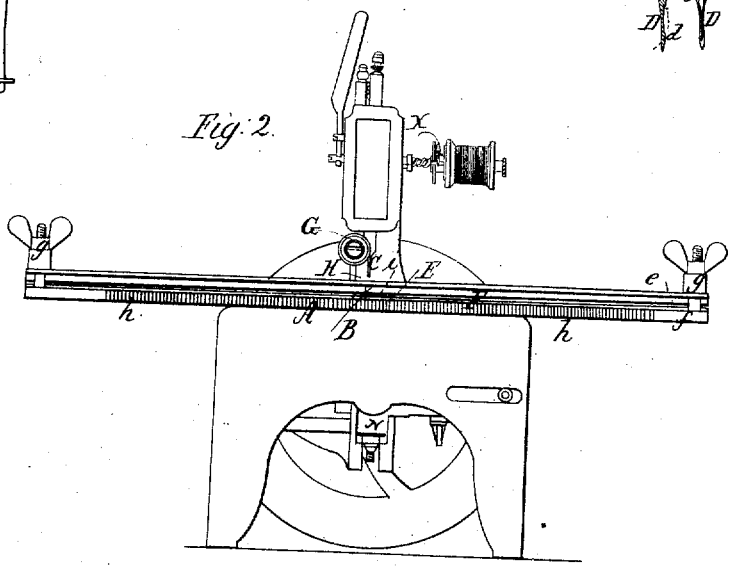
Figure 4:
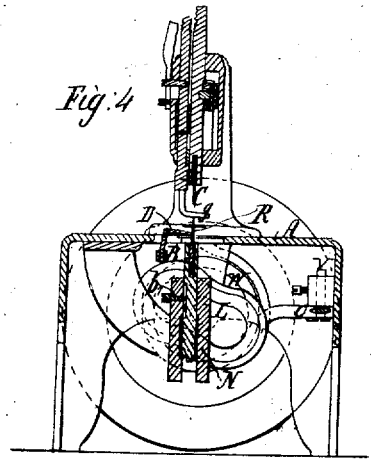
Figure 3:
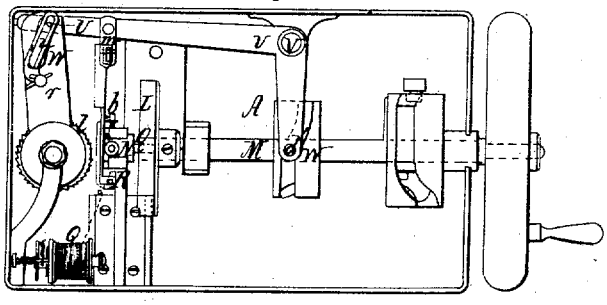
Figure 5:
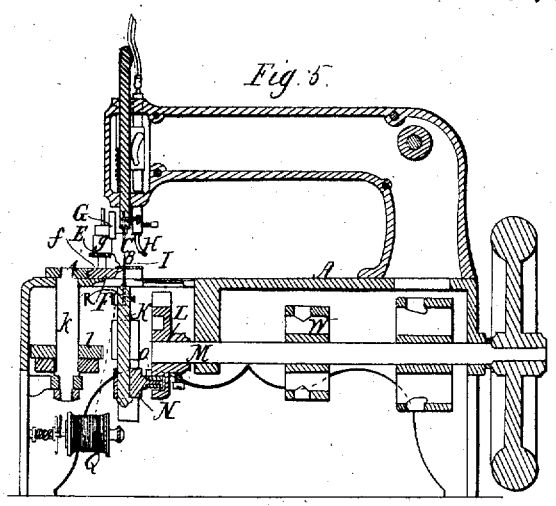

Figure 1 exhibits a top view of said machine; Fig. 2, a front elevation of it; Fig. 3, a bottom or under side view; Fig. 4, a transverse and vertical section, taken somewhat in front of the hook and looping-needle and so as to exhibit them; Fig. 5, a central vertical and longitudinal section of the machine.

In the said machine I perform the operation of sewing by means of two threads and form by them what is termed the "double-loop stitch." I do not claim as the invention of the said SWINGLE making with two needles and two threads a double-loop stitch wherein the loops are upon one side of the sewed material or cloth. Nor do I claim as the invention of the said SWINGLE making a seam or uniting two pieces of cloth by means of two threads so combined in a double-loop stitch that the loops of the thread may be enchained on one side of the cloth, while a single thread only will be exhibited on the opposite side of the cloth, as such have been accomplished and made subjects of a patent granted February 22, A. D. 1853, on an invention alleged to have been made by William H. Johnson. In such mode of sewing with two needles they were arranged to operate on opposite sides of the cloth—that is to say, the needle for puncturing the cloth was made to enter the same at that side of the cloth opposite to the one on which the other or looping needle was disposed.

In carrying out the said SWINGLE's invention or improvement on such mode of sewing or on mechanism to effect such, I employ to enter the cloth or material a hook in the place of a common needle made with an eye extending through it near its point, and I arrange said hook so that when operated it shall pass into the cloth at the same side of the cloth on which the looping-needle is situated and works. By so doing I gain important advantages, as I am enabled to operate or sew with waxed threads, and to so closely draw into the cloth or material the thread of the hook as to leave but three layers of thread on one face of the cloth, whereas when two needles are employed four layers of thread are so left. Besides this, the hook, during the process of drawing a loop through the cloth, passes entirely below the path of the looping-needle, presenting the loop to it to great advantage, and so moving out of the way of the looping-needle as to overcome the liability of said needle being carried into contact with it, so as to become broken or injured. Other advantages might be enumerated as resulting from the employment of a hook and its peculiar arrangement and operation with respect to the cloth and looping-needle.

In the drawings, A is the bed-plate or table of the machine; B, the hook or "hooked needle," as it is sometimes called; C, the awl or piercer arranged above the hook; D, a looping-needle; E, a clamp for holding the leather or material to be sewed. F is a bearer or curved rest, against which the clamp is borne during the operation of sewing with the machine, and on which the leather rests while being sewed. G is a friction presser or wheel pressed down upon the clamp for the purpose of keeping it in place when the machine is in motion. H is the thread-carrier for the hook B. The cloth or leather to be sewed is shown by red lines at I I in Figs. 10 and 5.

Figure 6:
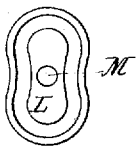

The hook B is supported in a carrier, K, to which vertical motions are imparted by a grooved cam, L, fixed on the driving-shaft M, a view of said cam being given in Fig. 6.

Figure 7:
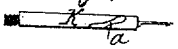

The hook-carrier is supported by a carriage, N, from which a stud, O, projects and extends in the groove of the cam L. The hook-carrier also has a partially-rotary motion in a horizontal direction imparted to it in order to enable its hook to be turned around while it is rising upward, and so as to bring its barb into a convenient position for the thread-carrier to lay the thread across the hook and underneath said barb. In order to accomplish this last motion of the hook, the carrier of said hook has a helix groove, *a*, formed in it, as seen in Fig. 7, which is a side view of the hook and its carrier. Into the groove a projection or stud, *b*, extending from the supporting-arm P (see Fig. 5) enters, the said supporting-arm being formed so as not only to sustain the slide or carriage of the carrier, but to guide it during its vertical movements.

Figures 8, 9:
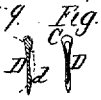

The looping-needle D is constructed as shown in section in Fig. 4, also in top view in Fig. 8. It should be made of spring-steel, and may have two eyes or thread-guides formed through it, as seen at *c* and *d*, and particularly in Fig. 9, which is a horizontal section of the needle, and exhibits the manner in which the thread extending from a bobbin, Q, is passed through said needle. The needle is supported on the top of a vertical projection or post, R, which extends from a horizontal slide or carriage, S. (See Fig. 3, also Fig. 10, which is a vertical and transverse section of the machine, taken through the hook and needle, and representing the parts or feeding apparatus in front of the same.)

Figure 10:
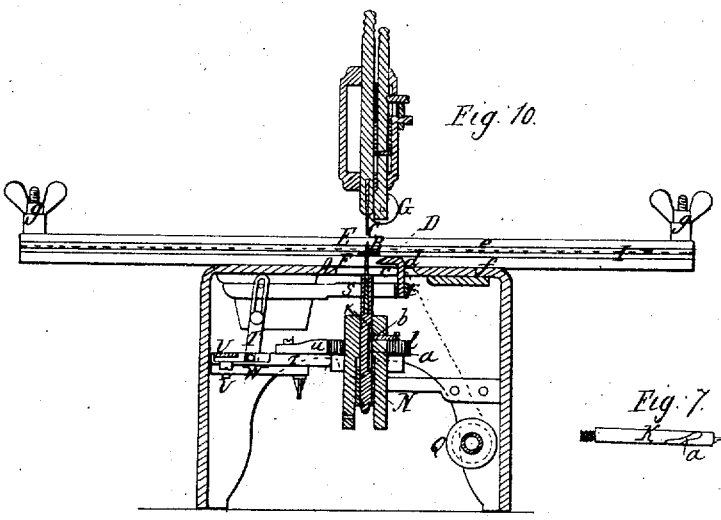
Figure 11:
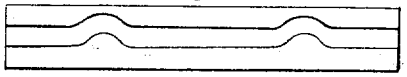

The slider S of the needle is operated by means of two levers, T and U, arranged as seen in Figs. 3 and 10, the lever U being made to turn upon a fulcrum, V, (see Fig. 4,) and be operated or moved by a grooved cam, W, fixed upon the driving-shaft, a projection or stud, *d'*, from the interior arm of said lever being made to extend into the groove of the cam. In Fig. 11 is represented the form of the groove of said cam as it would appear when developed upon a plane surface. The mechanism which is employed for operating the awl and thread-carrier of the hook does not differ essentially from such as is in common use for such purpose.

In this machine the clamp E for containing the leather or material to be sewed has the necessary form given to it for holding the parts of a boot-leg in order to "side up" the same. It is constructed of two bars or portions, *e f*, the upper of which is forced toward the lower by means of screws and nuts, as shown at *g g*. On the outer vertical edge of the lower of said bars a rack of teeth or cogs, *h*, is arranged, the same being made to engage with a feeding-gear, *i*, disposed horizontally above the upper surface of the table of the machine and fixed to the upper end of a vertical shaft, *k*, to which an intermittent rotary motion is imparted by means of a ratchet-gear, *l*, affixed to the shaft. The said ratchet-gear receives motion from a pawl or click, *u*, that is carried by a rocker-arm, *r*, which turns horizontally on the shaft of the feed-wheel and has a reciprocating motion imparted to it by means of a stud, *v*, and a grooved plate, *w*, the stud working in the slot or groove of said plate, and projecting from the superior arm of the long lever U. The slotted plate in which said stud operates is carried by or fastened to the rocker-arm above mentioned. By arranging the rack of the feeding-clamp on the vertical edge of said clamp, as described, and disposing or arranging the pinion of said rack horizontally on the top of the table, we are not only enabled to move the clamp longitudinally, but it is maintained close up to its guide or rest F; and, should the same be necessary, as is oftentimes the case, it may be moved a little laterally in order to accommodate the work or vary its position with respect to the hook, as occasion may require.

I am aware of the principle of the invention as patented by Edmund Shaw, August 22, A. D. 1854, the invention of said SWINGLE in the arrangement of the feed motion or mechanism being an improvement thereon, or one which secures new and important advantages in the operation of feeding the leather or material along during the process of sewing it, such improvement being subordinate to the device which is the subject of the claim made by the said Shaw in his patent.

In operating with the above-described machine the thread for its hook is taken from a bobbin, *x*, arranged as seen in Figs. 1 and 2, and is passed through the thread-carrier of said hook, the work or material to be sewed being sustained on the top surface of the support or rest F. After the awl has descended and punched a hole through the work the said awl rises, and the hook follows up through said hole, and immediately after the barb has been elevated above the work the hook is turned a little toward the thread-carrier in order that during its next downward movement it may seize the thread. On the descent of the hook the thread is drawn in the form of a loop through the work, the hook descending entirely below the horizontal needle, which next passes into the loop, and there remains long enough to permit the hook to rise and pass between said needle and the thread carried by it. The horizontal needle next falls back, having looped its thread around the shank of the hook. Next, the hook descends, as before, drawing a loop down with it through the cloth and the loop previously formed upon its shank. Thus the operation of sewing is carried on and the "double-looped stitch" produced, as hereinbefore described.

In consequence of the thread being drawn taut by the action of a hook, and after said hook has passed out of the hole into which it has pulled the thread, it will readily be seen that it will operate to much better advantage than an eye-pointed needle in drawing its thread closely into the work, and for the reason that the needle while drawing a thread is always in the hole with the thread, and particularly if said thread is waxed the friction of the thread against the sides of the hole is so great as to make it extremely difficult to draw the thread closely into the work without danger of breaking such thread. Thus when two needles are used to perform the double-looped stitch the loops of the needle by which the material is punctured generally project from the cloth and interlock the loops of the other needle about midway between each two holes in the material, the same serving to produce a greater projection of the loopings upon the surface of the cloth or material than takes place when a hook is used in the place of the puncturing-needle.

Consequently the improvement or machinery for making the double-looped stitch, and what I claim as of the said SWINGLE'S invention is—

1. The employment of a hook in connection with the looping-needle, and arranging said hook so that it shall pass into the cloth or material from the same side of it on which the looping-needle works or is situated.

2. The hereinabove-described new or improved method of arranging the feed motion or mechanism, the feed-wheel thereof being disposed horizontally, and its teeth made to engage with those of the rack situated on the vertical side of the clamp, the whole being substantially as specified.

In testimony whereof I have hereunto set my signature this 5th day of August, A. D. 1856.

ELMER TOWNSEND,
*Assignee of A. Swingle.*

Witnesses:
R. H. EDDY,
F. P. HALE, JR.